April 20, 1965  E. W. JACKOBOICE  3,179,183
GARDEN TRACTOR HYDRAULIC SYSTEM
Filed July 29, 1963  2 Sheets-Sheet 1

INVENTOR.
EDWARD W. JACKOBOICE
BY
ATTORNEYS

April 20, 1965 E. W. JACKOBOICE 3,179,183
GARDEN TRACTOR HYDRAULIC SYSTEM
Filed July 29, 1963 2 Sheets-Sheet 2

INVENTOR.
EDWARD W. JACKOBOICE
BY Price & Heneveld
ATTORNEYS

3,179,183
GARDEN TRACTOR HYDRAULIC SYSTEM
Edward W. Jackoboice, Grand Rapids, Mich., assignor to Monarch Road Machinery Company, Grand Rapids, Mich., a corporation of Michigan
Filed July 29, 1963, Ser. No. 298,322
2 Claims. (Cl. 172—303)

This invention relates to garden tractors and a hoisting mechanism in combination with the garden tractor, and more particularly to an attachment hoist unit for conventional garden tractors to hydraulically hoist the working tools or implements.

Garden tractors, widely sold today, employ a large variety of working implements, including mowers, plows, drags, rotary tillers, sweepers, grader blades, snow plows, and rotary snow throwers, to name only some. Many of these implements are exceptionally heavy. They are conventionally hoisted and lowered with a manual control handle pivotally mounted to the tractor frame. Hoisting a heavy implement, or lowering it to a specific intermediate height is often extremely difficult for operators including women, not used to heavy manual labor. There is a definite limitation to the leverage advantage obtainable for these heavy tools on the small tractors. Consequently, many buyers of this relatively expensive equipment later find that the "labor-saving" apparatus is, in fact, extremely difficult to operate and manipulate.

It is therefore an object of this invention to provide an implement-hoisting apparatus useful in combination with garden tractor equipment, and allowing working tools to be readily hoister, lowered or held at any particular level after attachment of the novel apparatus to the conventional garden tractor. There is no interference with the present controls. Moreover, mounting of the novel attachment, including the hydraulic pumping unit, to the conventional tractor is achieved easily and quickly.

It is another object of this invention to provide a hydraulic hoist control for garden tractor implements, with components attachable to the conventional lifting handle and to the conventional starter-generator of the tractor.

These and several other objects of this invention will become radily apparent upon studying the following specification in conjunction with the drawings, in which.

Referring specifically to the drawings, the novel combination 10 includes a conventional garden tractor, and a special attachment hydraulic hoist mechanism for implements, including hydraulic pumping apparatus 14 mounted to the starter-generator and hoisting means 16 mounted to the frame and lift handle.

Figure 3:
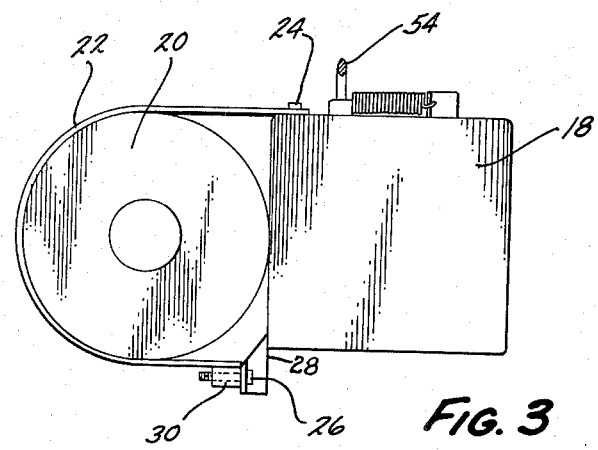
FIG. 3 is an end view of the hydraulic pump assembly mounted on the starter-generator, and taken on plane III—III of FIG. 1.

The pumping apparatus 14 includes a conventional hydraulic pump and reservoir combination 18 mounted to generator 20 of garden tractor 12 by a peripheral tension band 22 (FIG. 3). The steel band is bolted at its upper end by bolts 24 to pump housing 18, extends around the periphery of generator 20, and is secured by a bolt 26. The bolt extends through bracket 28 welded to housing 18, and into a threaded collar 30 affixed on the end of band 22. By tightening the bolt 26, housing 18 is secured tightly to generator 20.

Figure 4:
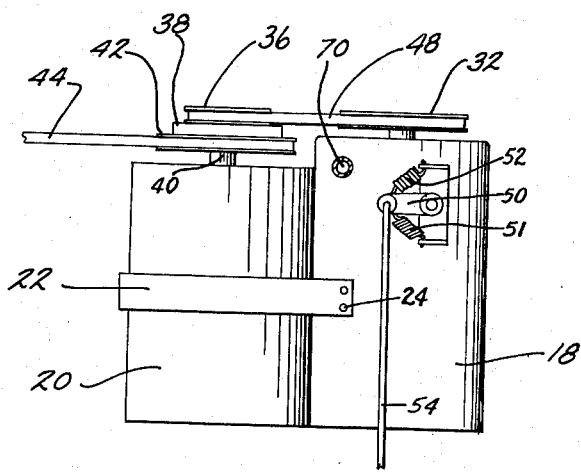
FIG. 4 is a top plan view of the generator and pump combination shown in FIGS. 1 and 3.

The pump 18 is driven, and more specifically, its pulley and shaft combination 32 (FIG. 4) are driven, by a special attachment pulley 36 on the shaft of generator 20. This attachment pulley 36 includes a hub 38 which has a tapped recess on the inside face thereof. The recess is threadably attached to the threaded outer end of generator shaft 40. (Usually a nut is attached to hold the conventional generator pulley 42 in place. This nut is removed to atach this special pulley.) The hub 38 integral with pulley 36 holds the conventional pulley 42 in position.

The generator pulley 42 is driven by a V-belt 44 from the main drive pulley of the engine. This drives pulley 36 on shaft 40 to thereby drive the second V-belt 48 extending from pulley 36 to pulley 32 on pump housing 18.

The pump assembly 18 includes an internal valve which is controlled by a valve actuating lever 50 on top of the housing. This lever is normally held centered by a pair of counter-acting coil springs 51 and 52. The lever is shiftable in either direction against the bias of one of the coil springs by pushing or pulling control rod 54. This rod extends from lever 50 to a mounting bracket 58 on the dash and within the reach of the tractor operator. A suitable knob 60 is fastened to the end of the control rod 54 for manipulation thereof.

Extending from housing 18 of the pump is a pressurized fluid conduit 70, which terminates at the dead end of hydraulic cylinder 72. This cylinder includes an internal chamber containing a shiftable piston (not shown) to which an extensible rod 74 is affixed and extends through one end of cylinder 72. The dead end of cylinder 72 includes a bifurcated portion with an intermediate slot 76 for pivotal straddling connection of the dead end of the cylinder to bar bracket 78 using a bolt or pin 80. This bracket is in turn affixed to an L-shaped bracket 82 by a pair of bolts 84. Bracket 82 is fixedly mounted to the frame 86 of the garden tractor.

The piston rod 74, extending out end cap 75 of cylinder 72, is also bifurcated to receive the lower end of a clamping bar or plate 84 mounted to the side of the conventional control handle 86 of the garden tractor. The lower end of this bar is bent to diverge from the control handle, and extend into the slot in the bifurcation of rod 74 for pivotal attachment thereto by a bolt or pin 88. The clamping plate 84 is fixedly mounted to handle 86 by a plurality (here shown to be 2) of U-shaped clamps 90 which extend around a substantial peripheral portion of the rod and are bolted to bar 84 by bolts 92.

Figure 1:
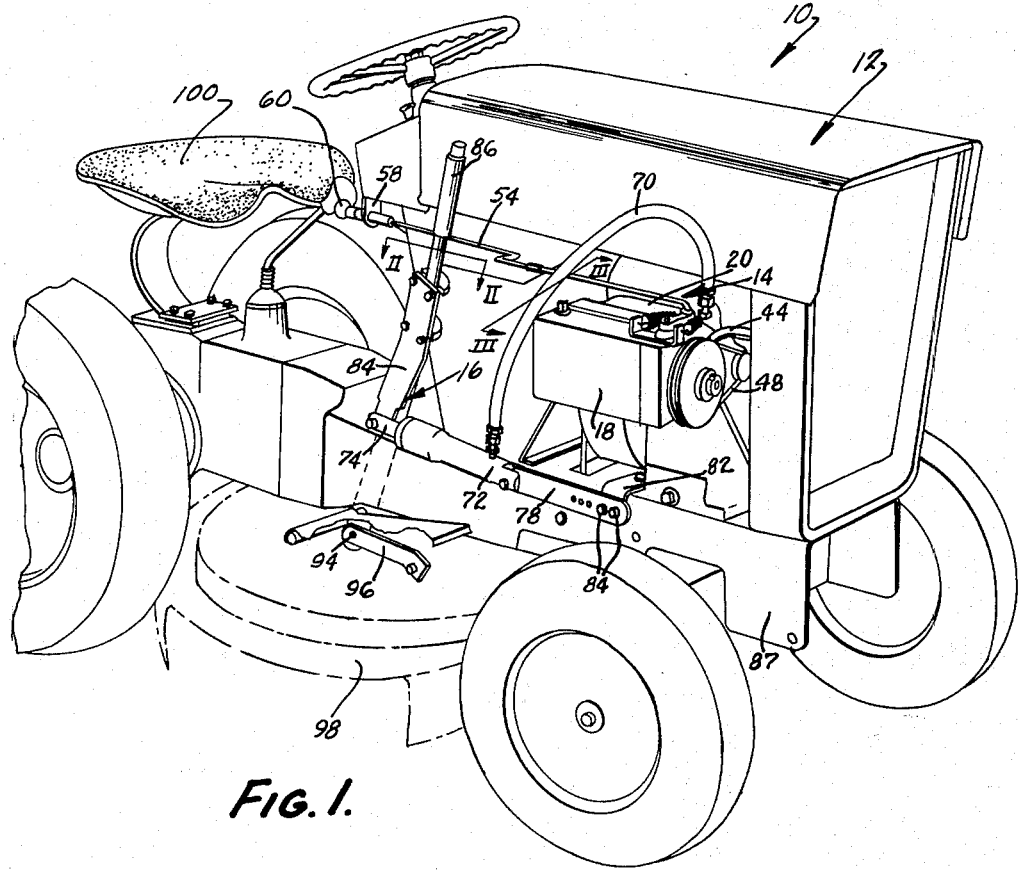
FIG. 1 is a perspective view of the novel combination garden tractor and hoist attachment.
Figure 2:
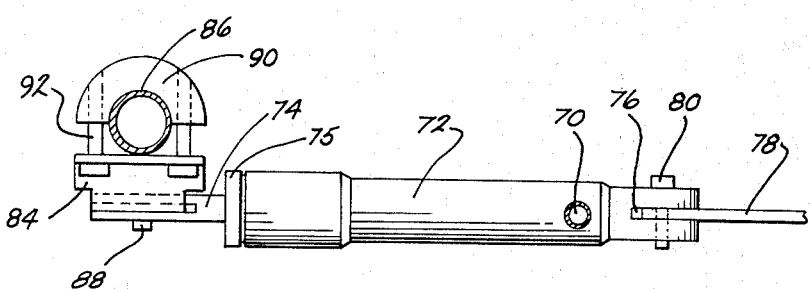
FIG. 2 is a sectional view of the handle mounted bracket forming part of the attachment illustrated in FIG. 1, and taken on plane II—II of FIG. 1.

The control handle 86 is pivotally mounted on a shaft 94, which is mounted to vehicle frame 87 in conventional fashion. Fixedly secured to the lower end of the control handle, and on opposite sides of the pivotal shaft or rod 94 are cantilever, forwardly-extending support beams 96 to which the implement 98 (shown in phantom in FIG. 1) is conventionally mounted. Thus, by movement of the control handle toward the driver on tractor seat 100, i.e. in a counterclockwise direction as viewed in FIG. 1, the cantilever beams 96 are elevated about the pivotal axis 94 to hoist implement 98. This often requires a substantial amount of effort due to the large weight of many implements employed on this type of vehicle.

Attachment

The apparatus is readily attachable to any conventional garden tractor in a matter of minutes. First band 22 is wrapped around conventional generator-starter 20, and bolt 26 is tightened to mount the pump. Then bracket 58 is bolted to the dashboard of the tractor and the control rod 54 is attached. L bracket 82 is bolted to the frame and bar 78 is attached to the cylinder 72 and to bracket 82. Plate 84 is attached to handle 86 by U-shaped clamps 90. Piston 74 is then attached to the lower end of plate 84. Then the hose connection 70 is made between the pump and cylinder. The unit is then ready for operation.

*Operation*

To elevate the implement mechanism with the attachment apparatus, all the driver needs to do is to either pull or push slightly on control rod 54 using knob 60. By pulling slightly on the rod, this shifts the valve lever 50 against the bias of valve spring 51 to open the internal valve and allow pressurized fluid to pass through conduit 70 and into the dead end of cylinder 72. This pushes the internal piston to the opposite end of the cylinder, thereby extending rod 74 to shift the bracket bar 84, and consequently, shift the conventional handle 86 therewith about pivotal axis 94, hoisting the implement.

The pressurized fluid is obtained by driving pump pulley 32 with belt 48, driven by pulley 36 from shaft 40.

Lowering of the implement is achieved just as readily, merely by pushing in on the control rod to rotate and shift lever 50 against the force of biasing spring 52. This vents the fluid in line 70 to an unpressurized reservoir in housing 18. The weight of the implement then drops cantilever beams 96 to rotate shaft 94, pivoting handle 86 and bracket 84 to force rod 74 back into the cylinder.

By merely releasing the control rod at any position of the implement, the lever is centered so that the valve is closed to both the atmospheric pressure reservoir, and the pressurized pump. The implement then remains in the same position until changed. Thus, with a few ounces of effort, the mechanism is readily controlled.

It will be noted that the cylinder must be pivotally connected on both ends to the bracket means, one of which is fixedly attached to the vehicle frame, and the other of which is fixedly attached to the manual implement hoist handle.

Other advantages of the apparatus will be apparent to those in this art upon studying the foregoing specification and drawings. It is also conceivable that certain minor obvious modifications could be made of the apparatus illustrated to employ the inventive concepts taught without utilizing the exact form of the invention illustrated. Therefore, these obvious modifications are deemed to be part of this invention, which is to be limited only by the scope of the appended claims and the reasonably equivalent structures to those defined therein.

I claim:

1. In combination with a garden tractor having a manual implement lift handle pivotally mounted to said tractor and pivoting about a point, and having an electricity generator, a hydraulic pump mounted to and driven by said generator; a control valve lever on said pump; a control rod operably connected to said lever; a hydraulic power cylinder having one dead end and an extensible rod protruding from the other end; bracket means affixed to said tractor and pivotally mounting said cylinder dead end; an elongated handle bracket affixed to said handle and extending along said handle between its ends with a plurality of U-shaped clamps around said handle and secured to said handle bracket; said rod being pivotally connected to said handle bracket; and a pressurized fluid line from said pump to said cylinder, whereby with actuation of said control valve lever, said cylinder is extended to shift said handle on its pivotal axis about said pivot point.

2. In combination with a garden tractor having a manual lift handle pivotally mounted to said tractor for pivoting about a point for hoisting implements, a hydraulic pump, a control valve lever on said pump; a hydraulic power cylinder having one dead end and an extensible rod protruding from the other end; bracket means affixed to said tractor and pivotally mounting said cylinder dead end; an elongated handle bracket mounted on said handle and extending along said handle between its ends, and a plurality of U-shaped clamps around said handle and bolted to said handle bracket to affix the bracket to the handle; said rod being pivotally connected to said handle bracket; said cylinder, when extended, shifting said handle on its pivotal axis about said pivot point.

References Cited by the Examiner

UNITED STATES PATENTS

| 651,282 | 6/00 | Wallis. | |
|---|---|---|---|
| 1,657,747 | 1/28 | Halmet | 74—15.63 |
| 2,076,673 | 4/37 | Roper | 172—303 X |
| 2,309,221 | 1/43 | Smith | 172—303 X |
| 2,346,321 | 4/44 | Mott | 172—303 X |
| 2,576,886 | 11/51 | McCoy | 56—25.4 |
| 2,634,618 | 4/53 | Bagley | 74—11 X |
| 2,687,004 | 8/54 | Rappl | 60—60 X |
| 2,945,338 | 7/60 | Burrows et al. | 56—25.4 |
| 3,071,198 | 1/63 | Blocker | 172—303 X |

FOREIGN PATENTS 617,058   3/61   Canada.

ABRAHAM G. STONE, *Primary Examiner.*